Figure 1:
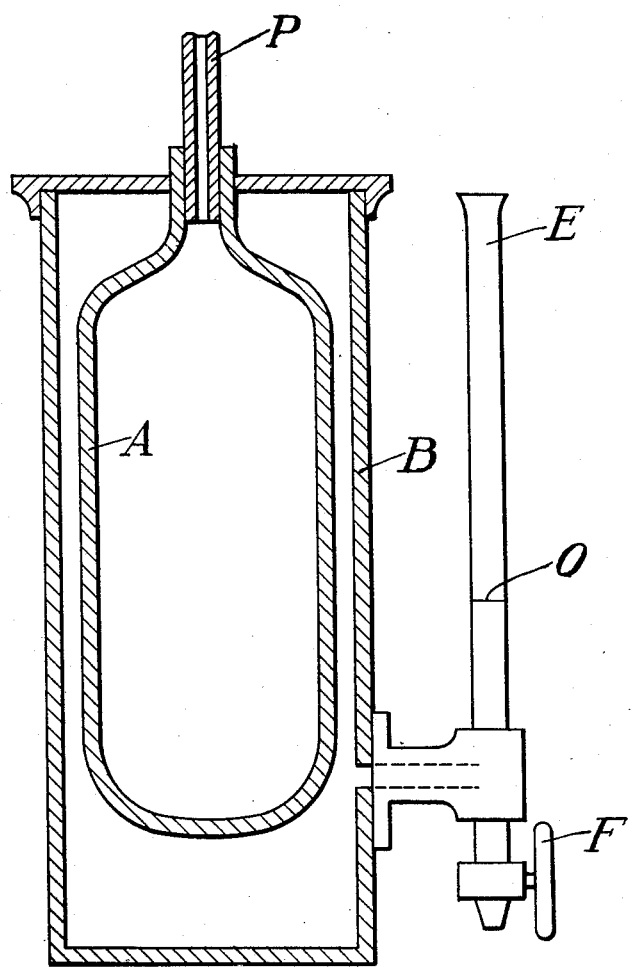

March 17, 1931.  H. E. STURCKE  1,796,489

PRESSURE MEASURING DEVICE

Filed July 14, 1927

Herman E. Sturcke INVENTOR.

BY Cipriano Andrade Jr.

ATTORNEY.

Patented Mar. 17, 1931

1,796,489

UNITED STATES PATENT OFFICE

HERMAN E. STURCKE, OF PORT ORANGE, FLORIDA; GEORGIE ETTA KUNTZ EXECUTRIX OF SAID HERMAN E. STURCKE, DECEASED

PRESSURE-MEASURING DEVICE

Application filed July 14, 1927. Serial No. 205,600.

My invention relates to means for determining an unknown pressure by a known deformation of a vessel, the deformation being known through the displacement of a fluid.

I attain this object by the mechanism illustrated in the accompanying drawing, in which—

The figure is a sectional side view of my device.

A is the vessel; B is the jacket; E is the displacement measuring element; 0 is the zero point in displacement measuring element E; F is a valve; and P is a pressure tube.

The operation of my device is as follows:

In order to accurately ascertain the unknown pressure in vessel A through pressure tube P, before the pressure is forced through pressure tube P into vessel A, the first thing is to fill the entire space inside of jacket B and outside of vessel A with water, oil, alcohol, mercury or any other desired fluid, which will also fill all of displacement measuring element E. The vessel B is next sealed air tight after the space referred to has been filled. Then open valve F, until the fluid in displacement measuring element E drops down to zero point 0; and then close valve F and permit the unknown pressure to come through pressure tube P into vessel A. This unknown pressure will thereupon deform vessel A, which will thereupon force part of the fluid into displacement measuring element E above said zero point 0, to a definite position, whereupon the said unknown pressure through pressure tube P can be definitely calculated to a certain known pressure. Or calculation may be avoided, and the unknown pressure ascertained by previous calibration of the device, against a dead weight pressure tester. Or the unknown pressure may be ascertained or calculated by putting various known pressures through pressure tube P, until one of said known pressures brings the fluid to the same height above zero point 0, as was done by the said unknown pressure.

It will be noted that the unknown pressure may be either positive or negative. In the case of the negative pressure or vacuum, it will of course be understood that in the displacement measuring element E the fluid would drop from zero point 0 downward to a certain position. And to calculate this negative pressure or vacuum, various known negative pressures could be put through pressure tube P, until one of said known negative pressures brings the fluid to the same position below zero point 0, as was done by the said unknown negative pressure.

It will of course be understood that my invention is not limited to the exact form of structure disclosed in the figure hereof; as my invention covers any mechanical equivalent thereof. For example, instead of putting the unknown pressure inside of vessel A, the same result could be accomplished by putting the pressure outside of vessel A and inside of jacket B, and having the fluid inside of vessel A, and the displacement measuring element E in contact with the inside of vessel A, whereupon the unknown pressure now outside of vessel A, would contract said vessel A. And with said contraction of vessel A, the fluid would rise above the zero point 0 of displacement measuring element E. And any other mechanical equivalent of these devices would produce the same result.

I claim:

1. In a pressure measuring device; a closed jacket; a closed vessel inside of said closed jacket; a displacement measuring element which is outside of the closed jacket, means establishing communication between the jacket and said displacement measuring element; there being a zero point in the lower part of the displacement measuring element and a valve at the lower end of said element, this valve being adapted to be opened to discharge liquid and to be closed when the level of the liquid in the displacement measuring element is at the zero point, the liquid filling the space inside the jacket and outside the closed vessel.

2. In a pressure measuring device; a closed jacket; a closed vessel inside of said closed jacket, a pressure tube leading through the closed jacket and communicating with the interior of the closed vessel; a displacement measuring element which is outside of the closed jacket, means establishing communication between the jacket and said displacement measuring element; there being a zero point in the lower part of the displacement measuring element and a valve at the lower end of said element, this valve being adapted to be opened to discharge liquid and to be closed when the level of the liquid in the displacement measuring element is at the zero point, the liquid filling the space inside the jacket and outside the closed vessel.

HERMAN E. STURCKE.